United States Patent
Bergeson

(10) Patent No.: US 6,588,141 B1
(45) Date of Patent: Jul. 8, 2003

(54) POISON CONTAINER

(76) Inventor: Michael B. Bergeson, 1805 Sandmont Dr., Roseville, CA (US) 95661

( * ) Notice: Subject to any disclaimer, the term of this patent is extended or adjusted under 35 U.S.C. 154(b) by 0 days.

(21) Appl. No.: 10/001,013

(22) Filed: Nov. 30, 2001

(51) Int. Cl.[7] .............................................. A01M 25/00
(52) U.S. Cl. .............................................. 43/131; 43/58
(58) Field of Search .............................. 43/131, 58, 61; 206/315.11, 315.1, 372, 373; 229/122.21, 122.23; 220/FOR 201, 844, 848

(56) References Cited

U.S. PATENT DOCUMENTS

| | | | | |
|---|---|---|---|---|
| 794,323 A | * | 7/1905 | Small | 43/131 |
| 1,309,606 A | * | 7/1919 | Bartholomew | 43/131 |
| 2,420,184 A | * | 7/1947 | Mekelburg | 43/131 |
| 2,683,326 A | * | 7/1954 | Gardner et al. | 43/131 |
| 2,944,364 A | * | 7/1960 | Kelly | 43/131 |
| 4,132,026 A | * | 1/1979 | Dodds | 43/131 |
| 4,228,613 A | * | 10/1980 | Kalnasy et al. | 43/131 |
| 4,550,525 A | * | 11/1985 | Baker et al. | 43/131 |
| 4,619,071 A | * | 10/1986 | Willis | 43/131 |
| 5,040,327 A | * | 8/1991 | Stack et al. | 43/131 |
| 5,136,803 A | * | 8/1992 | Sykes et al. | 43/131 |
| 6,082,042 A | * | 7/2000 | Issitt | 43/131 |

FOREIGN PATENT DOCUMENTS

AU   WO 94/06286   *  3/1994   ................... 43/131

* cited by examiner

Primary Examiner—Peter M. Poon
Assistant Examiner—Joan M. Olszewski

(57) ABSTRACT

Pest controlling device that exposes pests to poison, where the poison is inaccessible to children and pets. To attain this, a poisonous material is placed within an interior of the device and a path from the devices entrance to the interior is substantially impassable by pets. In an embodiment, the device is configured in such a way as to form a maze from the entrance to an interior of the device. In an embodiment, the device is a member, such as a rectangular box, having staggered top and bottom end walls thus providing an obstacle and maze.

10 Claims, 2 Drawing Sheets

POISON CONTAINER

BACKGROUND OF THE INVENTION

1. Field of the Invention

The present invention relates to a poison container for use in connection with pest control. The poison container has particular utility in connection with rodent control in areas frequented by pets and children.

2. Description of the Related Art

It is well known to combat rodents by placing poison in passageways traversed by rodents. However, this means of controlling rodent populations can be very dangerous because children and pets may also access the poison. Thus poison containers that hinder children and pets from accessing poison are desirable.

The use of poison containers accessible to rodents is known in the prior art. For example, U.S. Pat. No. 4,132,026 to Dodds discloses a simplified blank forming a rodent poison dispenser. However, the Dodds '026 patent appears to disclose a poison dispenser that would allow pets and children access. A child could reach in to the Dodds '026 poison dispenser and retrieve the poison, or a small pet could easily enter the Dodds '026 poison dispenser. Moreover, the Dodds '026 patent appears to disclose a poison dispenser that is limited to the use of powdered or granular poison without a means to maintain such granular poison within the dispenser. Consequently, Dodds '026 discloses a poison dispenser that provides children and pets easy access to poison. U.S. Pat. No. 4,375,732 to Waast discloses a refillable poison dispenser for combating rodents that appears to have theses same disadvantages. That is, the poison dispenser in the Waast '732 patent could allow a child to reach in to the device, or it could allow a small pet to enter the device. Further, the dispenser could disperse poison if tilted.

Similarly, U.S. Pat. No. 1,302,160 to Hedrich discloses a poison-containing dispenser that is refillable and that may be secured into the ground. However, the dispenser disclosed by the Hedrich '160 patent does not hinder children and small pets from accessing the poison. Moreover, the dispenser could disperse poison if tilted.

U.S. Pat. No. 890,430 to Mann discloses a poison dispenser that is "twice as long as an abnormally long child's arm" in an attempt to describe a poison dispenser that would prevent children from accessing the poison contained therein. However, the Mann '430 patent further discloses that the poison dispenser "will have an unobstructed view and passage through the entire device." Therefore, the Mann '430 patent does not prevent children or small pets from accessing the poison as a child could extend his reach into the dispenser by use of a stick or other probe, and a small pet could easily enter the dispenser.

Lastly, U.S. Pat. No. 4,663,882 to Koljonen discloses an automatic poison dispenser that may be mounted vertically. However, the Koljonen '882 patent does not prevent children or small pets from accessing the poison.

While the above-described devices fulfill their respective, particular objectives and requirements, the aforementioned patents do not describe a poison container that prevents children or small pets from access the poison. The above-mentioned patents make no provision for an obstructed passageway that would hinder access to all but rodents and that would maintain the poison within the container should it be tilted.

Therefore, a need exists for a new and improved poison container that would provide rodents with access to poison contained therein while significantly hindering access to children and pets. A need exists for a poison container having a maze through which a rodent could traverse to access the poison, such maze being substantially inaccessible to children and pets. In this regard, the present invention substantially fulfills this need. In this respect, the poison container according to the present invention substantially departs from the conventional concepts and designs of the prior art, and in doing so provides an apparatus primarily developed for the purpose of pest control in areas frequently by children and pets.

SUMMARY OF THE INVENTION

In view of the foregoing disadvantages inherent in the known types of poison containers and rodent traps now present in the prior art, the present invention provides an improved poison container, and overcomes the above-mentioned disadvantages and drawbacks of the prior art. As such, the general purpose of the present invention, which will be described subsequently in greater detail, is to provide a new and improved poison container and method of controlling pest populations which has all the advantages of the prior art mentioned heretofore and many novel features that result in a poison container which is not anticipated, rendered obvious, suggested, or even implied by the prior art, either alone or in any combination thereof.

To attain this, the present invention essentially comprises a device having a poisonous material within its interior and an entrance that is open in such a way as to form a maze from the entrance to the interior of the device. Such a maze would prevent children and pets from accessing poisonous material held within the device. In an embodiment, the device is a member, such as a rectangular box, comprising a top wall and a bottom wall where the bottom wall has a pair of opposed sidewalls. The bottom wall is attached to the bottom sidewalls. The top and bottom of the box are coupled together via these sidewalls. The device also comprises end walls. Each top end wall, for example, would be attached to the top wall. The bottom end walls would be similarly attached to the bottom wall and the bottom sidewalls. The end walls would be arranged such that the distance between the two bottom end walls is less than the distance between the two top end walls. The end walls may extend to the opposite wall, thus making the opening to the interior of the device very small.

There has thus been outlined, rather broadly, the more important features of the invention in order that the detailed description thereof that follows may be better understood and in order that the present contribution to the art may be better appreciated.

The invention may also include hinges or bait receptacles. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved poison container that has all of the advantages of the prior art poison dispensers and none of the disadvantages.

It is another object of the present invention to provide a new and improved poison container that may be easily and efficiently manufactured and marketed.

An even further object of the present invention is to provide a new and improved poison container that has a low cost of manufacture with regard to both materials and labor, and which accordingly is then susceptible of low prices of sale to the consuming public, thereby making such poison container economically available to the buying public.

Still another object of the present invention is to provide a new poison container that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

Figure 1:
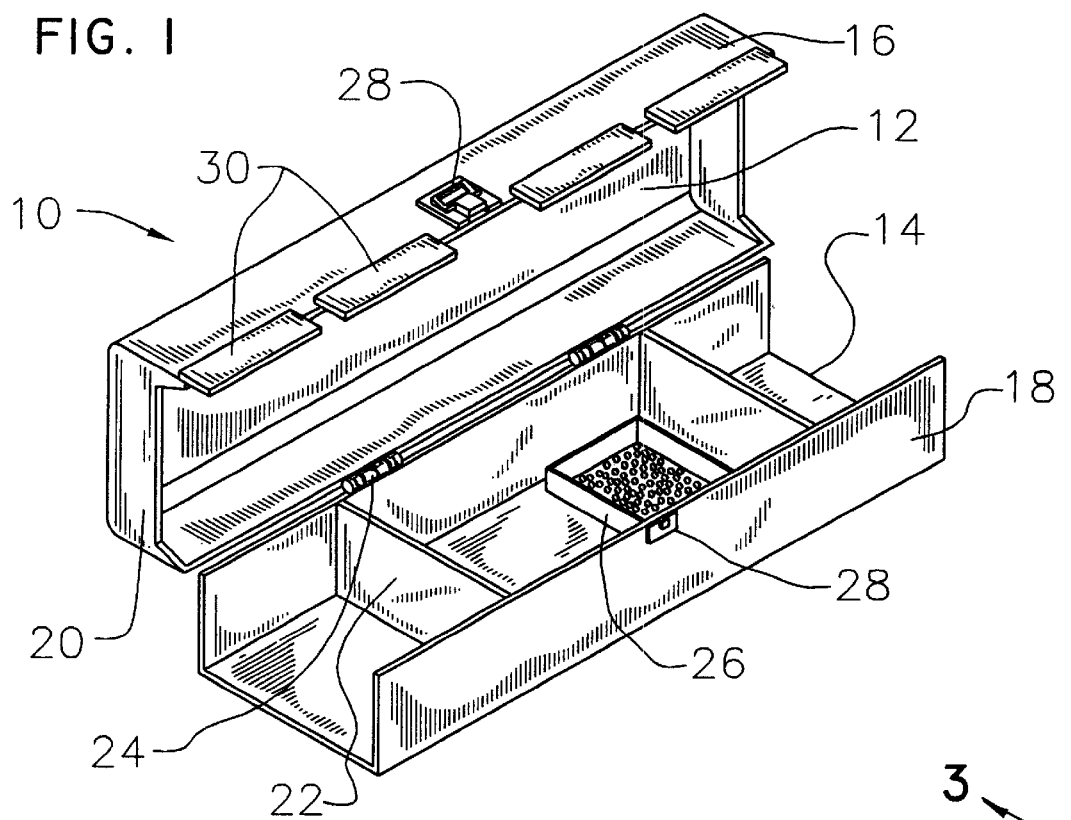
FIG. 1 is an oblique view of the preferred embodiment of the poison container where the poison container is shown opened.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Referring now to the drawings, and particularly to FIGS. 1–4, a preferred embodiment of the poison container of the present invention is shown and generally designated by the reference numeral 10.

In FIG. 1, a new and improved poison container 10 for exposing pests, such as mice or rats, to a poisonous material is illustrated and will be described as follows. The poison container 10 has a top wall 12 and a bottom wall 14. The bottom wall may be substantially planar, and/or the top wall may be substantially planar. In an embodiment, the bottom wall may be non-planar. A non-planar bottom or top wall may be desirable for accommodating a particular location, or mounting need. Further, a non-planar bottom or top may be desirable for the formation of a maze entry as will be discussed in further detail below. In normal use, an axis of the top wall may be substantially parallel to an axis of the bottom wall, but such parallel arrangement is not necessarily required.

The top and bottom walls are coupled together with the use of at least one pair of opposed sidewalls. The top and bottom walls may each have a pair of opposed sidewalls, i.e., top sidewalls 16 and bottom sidewalls 18. Top wall 12 and bottom wall 14 are coupled one to another via a combination of sidewalls. That is, top wall 12 and bottom wall 14 may be coupled together using either top sidewalls 16, or bottom sidewalls 18, or both. In an embodiment, the walls may be orthogonally arranged, thus forming a poison container having a rectangular cross section. Furthermore, top wall 12 and bottom wall 14 may be hinged together. In an embodiment, one of top sidewalls 16 may be coupled to the adjacent bottom sidewall 18 via use of a hinge 24. Hinge 24 may be any combination of hinges or hinging mechanisms or hinging methods known in the art. Further, hinge 24 may be arranged to any combination of a sidewall and a top or bottom thus allowing the poison container to be opened.

In the preferred embodiment shown in FIG. 1, poison container 10 includes a pair of opposed bottom end walls 22. Bottom end walls 22 are arranged such that they are each coupled to the bottom wall 14 and the bottom sidewalls 18.

The poison container may be opened as shown in FIG. 1 in order to place poisonous material into the container. Bottom wall 14, bottom end walls 22, and bottom sidewalls 18 form an area in which a poisonous material may be placed. Various types of poisonous materials may be used with the poison container. Further, the poisonous material may be of any form including powder, granular, solid, or liquid. The poisonous material may be placed in a bait tray 26. Bait tray 26 may be configured to best suit the form of poisonous material used. For example, bait tray 26 may be as shown in the figure, or bait tray 26 may be a container that dispenses fluids only in the presence of an animal, e.g. through a tube having a ball bearing regulating the flow. Therefore, bait tray 26 may be a container that is substantially closed. Furthermore, poison may be placed in the area bounded by bottom wall 14, bottom end walls 22, and bottom sidewalls 18 absent a separate container.

Figure 2:
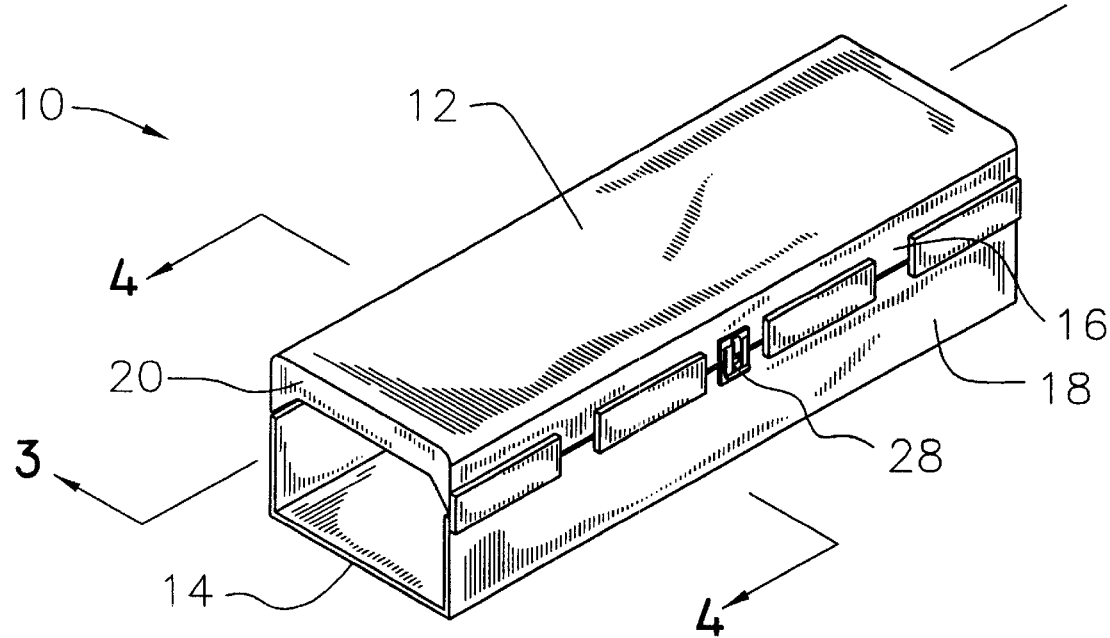
FIG. 2 is an oblique view of the poison container of the present invention in its normal position of operation. The poison container is constructed in accordance with the principles of the present invention.

FIG. 2 illustrates a preferred embodiment in a normal use position. That is, the poison container will normally be closed when not attended by humans. In an embodiment, the poison container may be locked closed such that a child or pet may not open the poison container. For example, locking means 28 may be used to maintain the poison container in a locked position. In an embodiment, one of top sidewalls 16 may be locked to the adjacent bottom sidewall 18 via use of a lock 28. Lock 28 may be any combination of lock, locking mechanisms or locking methods known in the art. Further, lock 28 may be arranged to any combination of a sidewall and a top or bottom thus allowing the poison container to be locked close. That is, in an embodiment comprising, for example, a top wall, a bottom wall, and only one pair of sidewalls, bottom sidewalls in this case, a lock may be affixed to the top wall and one of the pair of bottom walls.

FIGS. 1 and 2 also illustrate top end wall 20. Each top end wall 20 is arranged such that it is coupled to the top wall 12. In an embodiment, top end wall 20 is also coupled to both top sidewalls 16. Top end wall 20 may be commensurate with an entrance to the poison container 10. An object of the present invention is to provide a maze from the entrance of the poison container 10 to the poisonous material arranged within. In its simplest form, a maze may be any configuration that prohibits a direct view of the poisonous material from an entrance. Furthermore, a maze may include at least two interconnecting pathways. The pathways could be substantially horizontal or substantially vertical. Further, a maze may include an obstacle to be climbed over. In the case of a maze having an obstacle, the path from the entrance to the poisonous material would be horizontal from the entrance to the obstacle, vertical as the obstacle is scaled, and horizontal as the obstacle is crossed. Such a maze would be arranged to be substantially inaccessible to pets. Further, a child could not reach into the poison container and access the poison, even if the child were to extend his reach using, e.g., a stick.

Figure 3:
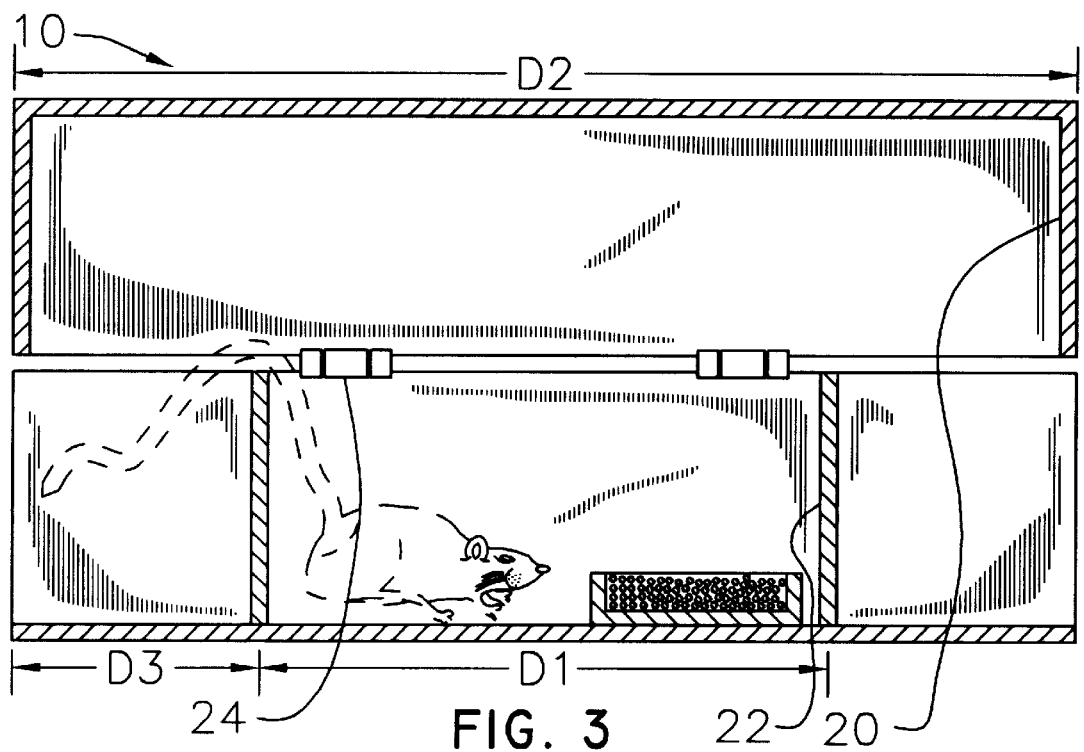
FIG. 3 is a cross-section view of the poison container of the present invention. The cross-section is taken on line 3 of FIG. 2

The maze from an entrance of the poison container 10 to the poison within is shown in FIG. 3. FIG. 3 is a cross section view of poison container 10, where the cross-section is taken on line 3 of FIG. 2. In order to access the poison, a rodent could travel below top end wall 20, across bottom wall 14 to bottom end wall 22, and then over bottom end wall 22. To prevent access past the entrance, top end wall 20 may extend such that the distance between top end wall 20 and bottom wall 14 is as small as approximately one inch. To prevent access into the interior of the poison container, bottom end wall may extend such that the distance between bottom end wall 22 and top wall 12 is as small as approximately one inch. The end walls may be substantially rectangular, although they may not necessarily be rectangular. As shown in FIG. 3, the top end walls 20 are rectangular having additional triangular extensions adjacent to each sidewall. Furthermore, the end walls may extend from the top wall to the bottom wall with only a small area removed from the end wall. That is, the end wall could be a rectangle having only a small area removed through which a rodent could pass. The small area removed could be of any shape.

The distance between the two bottom end walls 22 is denoted D1, and the distance between the two top end walls 20 is denoted D2. In an embodiment, the distance D1 is less than the distance D2. As shown, the poison container 10 has two entrances. However, the poison container may have only one entrance. That is, one top end wall could be substantially commensurate with one of the bottom end walls. At the at least one entrance to the poison container shown in FIG. 3, the distance between a top end wall and a bottom end wall is denoted D3. The distance D3 could be from around approximately 1 inch to around approximately 7 inches.

Figure 4:
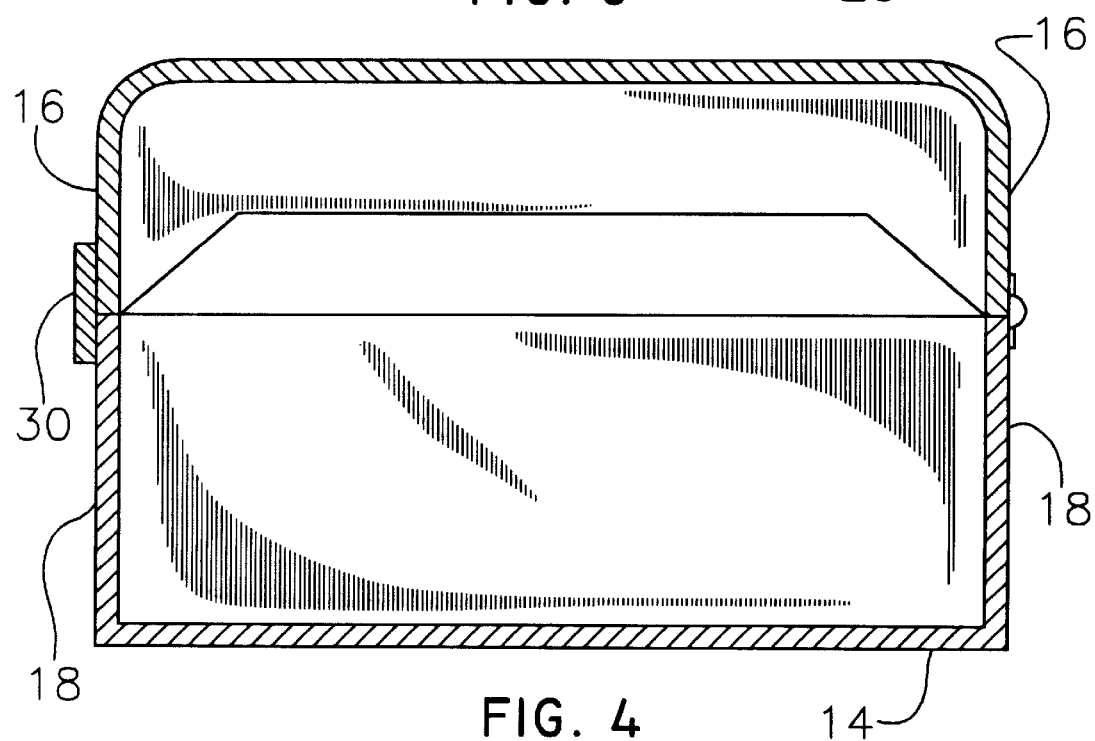
FIG. 4 is a cross-section view of the poison container of the present invention. The cross-section is taken on line 4 of FIG. 2.

FIG. 4 is a cross section view of poison container 10, where the cross-section is taken on line 4 of FIG. 2. Poison container 10 could be made from any of numerous materials. As shown, poison container 10 is of a plastic construction. However, poison container 10 may be made of a relatively stiff yet bendable material such as paperboard, sheet metal or sheet plastic. Consequently, side reinforcements 30 may be used to prevent a child or pet from prying or otherwise opening the closed poison container 10.

In use, it can now be understood that the poison container described herein would provide rodents with easy access to poisonous materials while rendering such poisonous materials substantially inaccessible to children and small pets. While a preferred embodiment of the poison container has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, cardboard, or a variety of wood may be used instead of the plastic construction described. Also, the bait tray may also be made of heavy-duty plastic, wood, or similar material. And although controlling rodents has been described, it should be appreciated that the poison container herein described is also suitable for exterminating a wide variety of pests capable of accessing a suitably configured poison container allowing access to the targeted pest yet substantially restricting children and pets. Furthermore, a wide variety of poisons and baits may be used. The poison may be the type that the animal eats directly and is thereby poisoned or it may be the type that the animal gets on its body, feet, or fur and ingest later by licking for grooming purposes. Still further, the poison may be one that may poison the animal upon contact.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for exposing pests to a poisonous material, comprising:

a member including opposed top and bottom walls, wherein the bottom wall has a pair of opposed bottom sidewalls, and wherein the top and bottom walls are coupled together by the opposed bottom sidewalls; and a pair of opposed top end walls, wherein each top end wall is coupled to the top wall; and a pair of opposed bottom end walls, wherein each bottom end wall has no opening there through, and wherein each bottom end wall is coupled to the bottom wall and the bottom sidewalls thereby forming an area for retaining a poisonous material, and wherein a distance between the bottom end walls is substantially less than a distance between the top end walls.

2. The device as recited in claim 1, wherein the top walls have a pair of opposed top sidewalls.

3. The device as recited in claim 2, further comprising hinging means, said hinging means coupled to a top sidewall and a bottom sidewall.

4. The device as recited in claim 1, wherein the bottom end walls extend such that a distance between the bottom end walls and the top wall is as small as one inch.

5. The device as recited in claim 2, wherein the top end walls extend such that a distance between the top end walls and the bottom wall is as small as one inch.

6. The device as recited in claim 1, further comprising a bait tray arranged within the area for retaining a poisonous material.

7. The device as recited in claim 1, further comprising locking means.

8. The device as recited in claim 1, wherein the member having a substantially rectangular cross section.

9. The device as recited in claim 1, wherein the top end walls are substantially rectangular.

10. The device as recited in claim 2, wherein the top end walls extend commensurate with the top sidewalls.

\* \* \* \* \*